March 31, 1925.  1,531,750

E. F. KRUEGER

AGITATING DEVICE

Filed July 15, 1922  2 Sheets-Sheet 1

Inventor
Edward F. Krueger

By

Attorneys

March 31, 1925.
E. F. KRUEGER
AGITATING DEVICE
Filed July 15, 1922
1,531,750
2 Sheets-Sheet 2
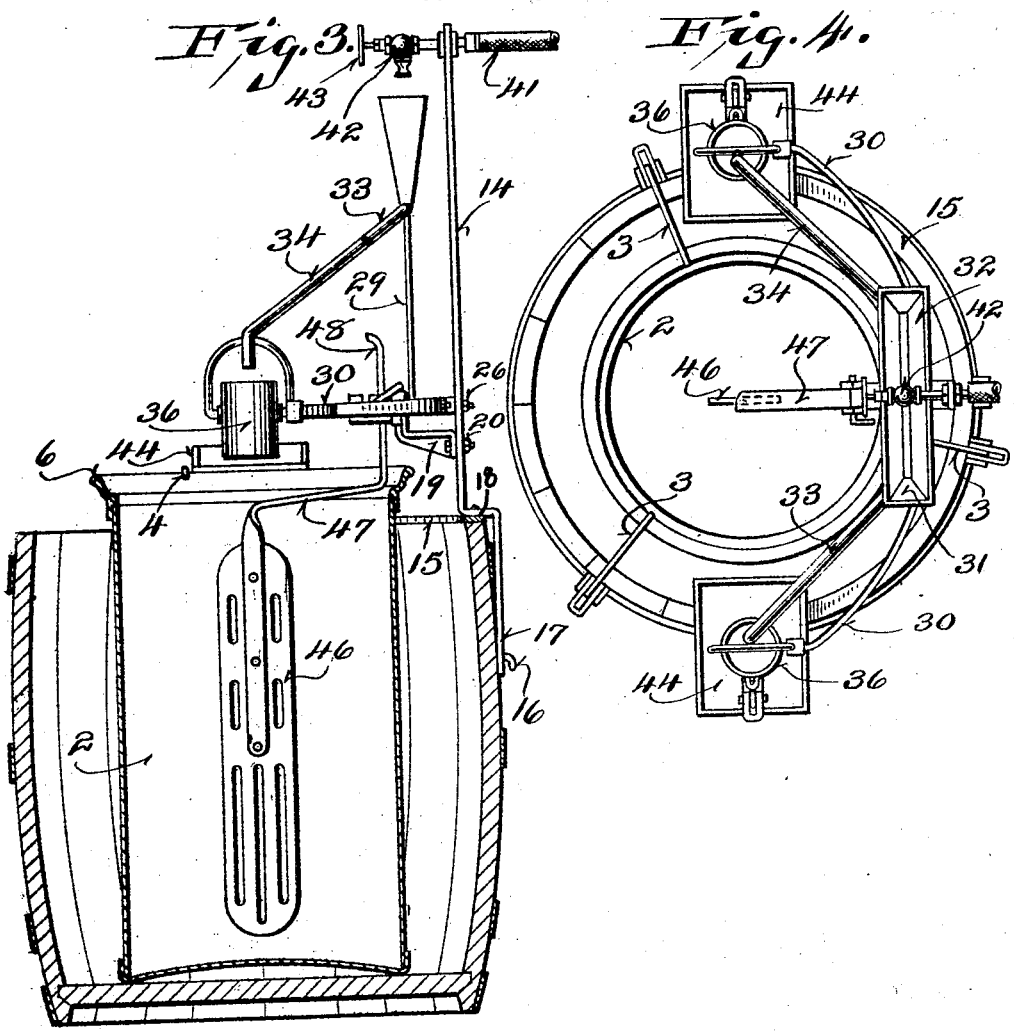
Inventor
Edward F. Krueger Patented Mar. 31, 1925.

1,531,750

UNITED STATES PATENT OFFICE.

EDWARD F. KRUEGER, OF CLINTONVILLE, WISCONSIN.

AGITATING DEVICE.

Application filed July 15, 1922. Serial No. 575,302.

*To all whom it may concern:*

Be it known that I, EDWARD F. KRUEGER, a citizen of the United States, and resident of Clintonville, in the county of Waupaca and State of Wisconsin, have invented certain new and useful Improvements in Agitating Devices; and I do hereby declare that the following is a full, clear, and exact description thereof.

This invention relates to cooling devices, and is particularly directed to devices for cooling milk.

In cooling some liquids, particularly fresh milk, it is desirable to immediately remove as much of the initial heat as possible, as it is a well known fact that any bacteria or other detrimental matter contained in the milk causes a very rapid deterioration unless it is checked by immediately cooling. This effect is particularly noticeable in fresh milk as the animal heat is pronounced and it therefore becomes very desirable to immediately remove such heat.

Objects of this invention are to provide a device which will rapidly cool the milk; which will agitate the milk while it is being cooled and thereby cause all of the milk to successively contact with the container walls, and to provide such a device which is suitable for farm use.

Further objects are to provide a device adapted to receive cooling water, adapted to agitate the milk by mechanism operated from such cooling water, and to provide such a device so organized that a minimum number of parts are employed.

Further objects are to provide a device which may be very simply constructed and which is adapted to utilize any usual casing, such as a barrel, for instance, and to utilize the usual milk can; to provide such a device which is readily separable into its component parts to admit of quick and easy cleaning, and to provide such a device with means for definitely and positively holding the milk can within the casing.

An embodiment of the invention is shown in the accompanying drawings, in which—

Figure 3 is a vertical elevation taken at right angles to Figure 1.

Figure 4 is a plan view of the apparatus.

Figure 1:
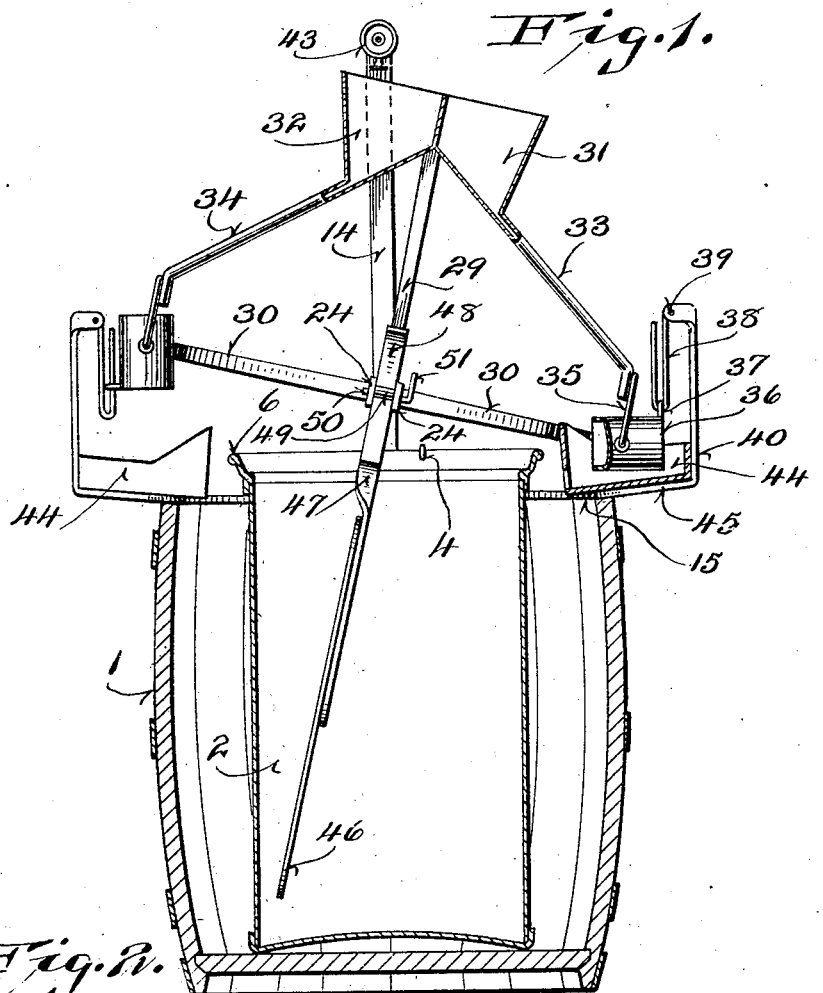
Figure 1 is a vertical sectional view of the apparatus.

The device comprises a casing which may be a barrel, as indicated at 1 in the drawings, within which is positioned a milk can 2 of any usual or ordinary construction. Any suitable means may be provided for holding the can 2 in position as for instance the arms 3. A frame work comprising an upwardly extending arm 14 and a semi-circular band 15, is detachably retained in position upon the upper portion of the casing 1. A convenient way of retaining this frame work is by means of a hook 16, secured to the casing 1 and passed thru an opening in a downwardly directed extension 17 of the upright 14, the right angle bend 18 being positioned above the upper edge of the barrel (see Figure 3). This framework includes a bracket 19, which is bolted at 20 to the upright 14, and is provided at its outer end with a bearing 21. A sleeve 22 is revolubly mounted within the bearing 21, and is provided at its outer end with an enlarged head 23, from which extends a pair of ears 24, whose purpose will later be described.

A headed supporting pin 25 is passed thru the sleeve 22 and secured to the upright 14 by any suitable means, as for example, a nut 26. It is to be noted that the head of the pin 25 prevents the sleeve 22 from shifting outwardly from the upright 14, and that such sleeve is furnished with an outer bearing 21, previously described, and with an inner bearing, namely the pin 25, thereby securing an adequate pivotal support. The sleeve 22 is furnished with an upwardly projecting ear 27, and with horizontally projecting ears 28, to which are bolted, respectively, an upwardly extending arm 29, and horizontally extending curved arms 30, such arms constituting an oscillating framework.

The oscillating mechanism for this framework comprises a pair of funnel shaped receptacles 31 and 32, carried by the upper end of the arm 29 and terminating at their lower ends in diagonally and forwardly extending pipes 33 and 34 respectively. The outer ends of these pipes are secured to the bail portions 35 of buckets or receptacles 36. These buckets are provided with perforated ears 37, which are engaged by elongated hooks 38, pivotally mounted at 39 in an extension 40 of the semi-circular band 15 of the framework. Any suitable source of cooling water may be utilized, and this cooling water is conducted to the apparatus by means of a pipe 41 terminating in a fixture 42, rigidly secured adjacent the upper end of the upright 14 and preferably provided with a controlling valve 43.

It will be seen, from the structure thus far described, that when the cooling water is supplied, it flows into one or the other of the funnel shape members 31 and 32, and is guided downwardly into the appropriate receptacle 36. When this receptacle is filled, the weight of the water rocks the oscillating framework sidewise until the bucket or receptacle is tilted by the engagement of the ear 37 with the elongated hook 39. When this occurs, the water contained in the receptacle is discharged, and the opposite receptacle is moved into a position to be filled with the incoming cooling water. In order to prevent splashing of the discharged water, guiding troughs 44 are secured beneath the hooks 38, and are preferably carried by a portion 45 of the framework such portion joining the band 15 with the upwardly extending arm 40.

Figure 2:
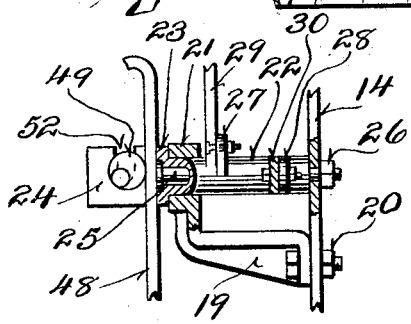
Figure 2 is an enlarged fragmentary detail of a portion of the mechanism.

A paddle 46, which may be of elongated and perforated formation, is carried by an angular arm 47, the upper end of which 48 is positioned against the enlarged head 23 (see Figure 2) of the revolubly mounted sleeve 22. The paddle is clamped in its adjusted position, by means of an eccentrically mounted cylindrical member 49, carried upon an operating shaft 50, such shaft terminating in a handle 51. This shaft is carried in the ears 24, and is seated in a rearwardly directed portion of slots 52 formed in such ears, as may be readily seen from Figure 2.

It will be seen therefore, that a device has been provided which is admirably adapted to cool milk, which will agitate the milk while it is being cooled and cause all portions thereof to contact with the chilled walls of the container 2, such container, of course, being surrounded by the discharged cooling water.

It will also be seen that the parts may be readily separated and cleaned, and that the usual milk can and any suitable casing or container 1 may be employed.

Although one specific form of the invention has been described in detail, it is to be understood that various modifications may be resorted to without departing from the spirit of the invention, and that such invention is to be limited only as set forth in the appended claim.

I claim:

A device of the class described comprising a support, a frame pivoted therein and including a rock arm, a pair of hoppers carried by the upper end of said frame, a nozzle positioned above said hoppers, and adapted to discharge liquid into said hoppers, conduits leading from said hoppers downwardly and outwardly, buckets pivotally carried by the outer ends of said rock arm and adjacent the lower end of said conduits, apertured ears projecting outwardly from said buckets, and U-shaped members connected to said support and loosely passing through said ears and adapted to tilt said buckets when they occupy a lowered position.

In testimony that I claim the foregoing I have hereunto set my hand at Clintonville, in the county of Waupaca and State of Wisconsin.

EDWARD F. KRUEGER.